(12) United States Patent
Dart et al.

(10) Patent No.: US 7,497,953 B2
(45) Date of Patent: *Mar. 3, 2009

(54) WATER TREATMENT APPARATUS AND METHOD

(75) Inventors: Frederick James Dart, Toronto (CA); John Owen Richmond, Toronto (CA)

(73) Assignee: Envirotower Inc. (CA)

( * ) Notice: Subject to any disclaimer, the term of this patent is extended or adjusted under 35 U.S.C. 154(b) by 33 days.

This patent is subject to a terminal disclaimer.

(21) Appl. No.: 10/876,449

(22) Filed: Jun. 28, 2004

(65) Prior Publication Data

US 2005/0011839 A1 Jan. 20, 2005

(51) Int. Cl.
*C02F 1/50* (2006.01)
*C02F 1/76* (2006.01)
*C02F 5/00* (2006.01)

(52) U.S. Cl. ............. 210/696; 210/702; 210/721; 210/748; 210/752; 210/753; 210/764; 422/19; 422/37

(58) Field of Classification Search ............ 210/696
See application file for complete search history.

(56) References Cited

U.S. PATENT DOCUMENTS

| | | | | |
|---|---|---|---|---|
| 3,754,741 A | * | 8/1973 | Whitehurst et al. | 261/151 |
| 3,805,880 A | * | 4/1974 | Lawlar | 165/60 |
| 4,149,969 A | * | 4/1979 | Robitaille et al. | 252/181 |
| 4,422,933 A | * | 12/1983 | Sverre et al. | 210/222 |
| 4,861,489 A | * | 8/1989 | Swift et al. | 210/668 |
| 5,057,229 A | * | 10/1991 | Schulenburg et al. | 210/743 |
| 5,294,916 A | * | 3/1994 | Bolton et al. | 340/606 |
| 5,480,564 A | * | 1/1996 | Pope et al. | 210/753 |
| 5,525,241 A | * | 6/1996 | Clavin et al. | 210/753 |
| 5,695,644 A | * | 12/1997 | Buchanan et al. | 210/696 |
| 5,858,219 A | * | 1/1999 | Kusmierz et al. | 210/167.3 |
| 6,139,731 A | * | 10/2000 | Harvey et al. | 210/175 |
| 6,274,054 B1 | * | 8/2001 | Murphy, Jr. | 210/764 |
| 6,740,231 B1 | * | 5/2004 | Bauman et al. | 210/96.1 |
| 6,761,827 B2 | * | 7/2004 | Coffey | 210/748 |
| 6,982,040 B2 | * | 1/2006 | Costa et al. | 210/753 |
| 7,033,509 B2 | * | 4/2006 | Klein et al. | 210/753 |
| 7,244,360 B2 | * | 7/2007 | Cho | 210/712 |

* cited by examiner

*Primary Examiner*—Peter A Hruskoci
(74) *Attorney, Agent, or Firm*—Fitch, Even, Tabin & Flannery

(57) ABSTRACT

An automatic, self-regulating method of water treatment for use in water circulating towers in which water is evaporated, and make up water is added, with components which synergistically function to cut chemical, energy, water, corrosion, pollution, and maintenance costs, by passing the water through a Water Conditioning unit to prevent adhering evaporation scale deposits along with their content of concentrated biofouling nutrients from forming on the flooded surfaces of the tower and its associated water flow circuit, adding a trace level of iodine to the input make-up water to enhance the further disinfection of nutrient-deprived surfaces from any residual biofllm and chance pathogen contaminations, and adding a trace level addition of zinc ions in the water such as by an assured treatment feeder to the input make-up flow for inhibiting residual iodine-resistant algal and bacterial organisms of hazard for restoring bionutrient tower conditions, such as within sun-lit environments, and apparatus for carrying out the foregoing method.

12 Claims, 4 Drawing Sheets

WATER TREATMENT APPARATUS AND METHOD

FIELD OF THE INVENTION

A water treatment method using a unique synergistic combination of water treatment components performing treatment steps automatically and continuously applied to the make-up and recirculation waters in evaporative cooling towers, and to apparatus for the application of such a method.

BACKGROUND OF THE INVENTION

Cooling towers are widely used in H.V.A.C. and Industry. The towers will normally employ evaporation of water, and heat exchange the building HVAC circulating water, to cool water. The evaporation results in the concentration of dissolved solids in the cooling tower recirculation water. Scale, principally in the form of calcium carbonate, can build up, thereby reducing the rates of heat transfer and hence the efficiency of the tower. The water is also suitable for the growth of biological contaminants such as bacteria and algae. Biofouling organisms, using organic nutrients collected by scale deposits, attack system surfaces with corrosive acids to further increase dissolved particulate contamination Conventional chemical treatment, particularly since chromates were banned by E.P.A., in practice, does not control scale, corrosion or microbiological contamination, and produces the potential liability of toxic discharge water into the environment, and handling barrels of toxic chemicals.

U.S. Pat. No. 4,830,761, Leach et al., disclose a method of recirculation cooling tower basin water through a series of filter bags in order to reduce the amount of particulate contamination. At least one other prior art approach suggests using a combination of filtration and treatment with redox media to reduce contamination in recirculation cooling tower waters. However scale is not controlled, backwashing cycles are mandatory, and the copper compounds used plate out onto the metals of the equipment. Ozone treatment, among other disadvantages, does not prevent scale formation and is restricted in application. The known prior art methods do not eliminate scale, and do not offer 24 hour/day, automatic, effective protection against *legionella*, scale, corrosion and microbiological contamination.

BRIEF SUMMARY OF THE INVENTION

The present invention provides an improved method and apparatus for automatically eliminating scale, minimizing particulate contaminants, *legionella* and controlling corrosion, fouling & microbiological contamination in cooling tower recirculation water, 24 hours per day.

In particular, the invention provides a first Module A for the treatment of incoming make-up water, and a second Module B for the treatment of the cooling tower recirculation water. The first Module A directs some incoming make-up water through an iodine canister (18), and also through a micromineral suppressant canister (20), containing zinc, in order to provide metered, low levels of iodate and zinc, to suppress bio-organic contamination throughout the tower. All incoming make up water also passes through a physical type, self-cleaning water conditioner (22), which prevents the formation of scale dissolves old scale and inhibits corrosion.

The second Module B includes a pump (24) that recirculates the tower sump water through a strainer (26), a centrifugal separator (28) and a physical type, self-cleaning water conditioner (30) which maintains the water in an unsaturated state The strainer (26) removes the larger particulates and any debris that gets into the tower (32). The centrifugal separator (28) brings the particulates down to minus 40 microns throughout the recirculation system, in addition the conditioner (30)

produces large calcium carbonate particles, which in turn coagulate with the organics, and are blown down by the separator (28) and a 'blow-down' valve.

An alternative second Module B can consist of a bypass pipe installed across the cooling tower recirculation pump inlet and outlet pipes; with the separator (28), conditioner (30) and flow meter (34) mounted in this by pass pipe.

DETAILED DESCRIPTION

Figure 1:
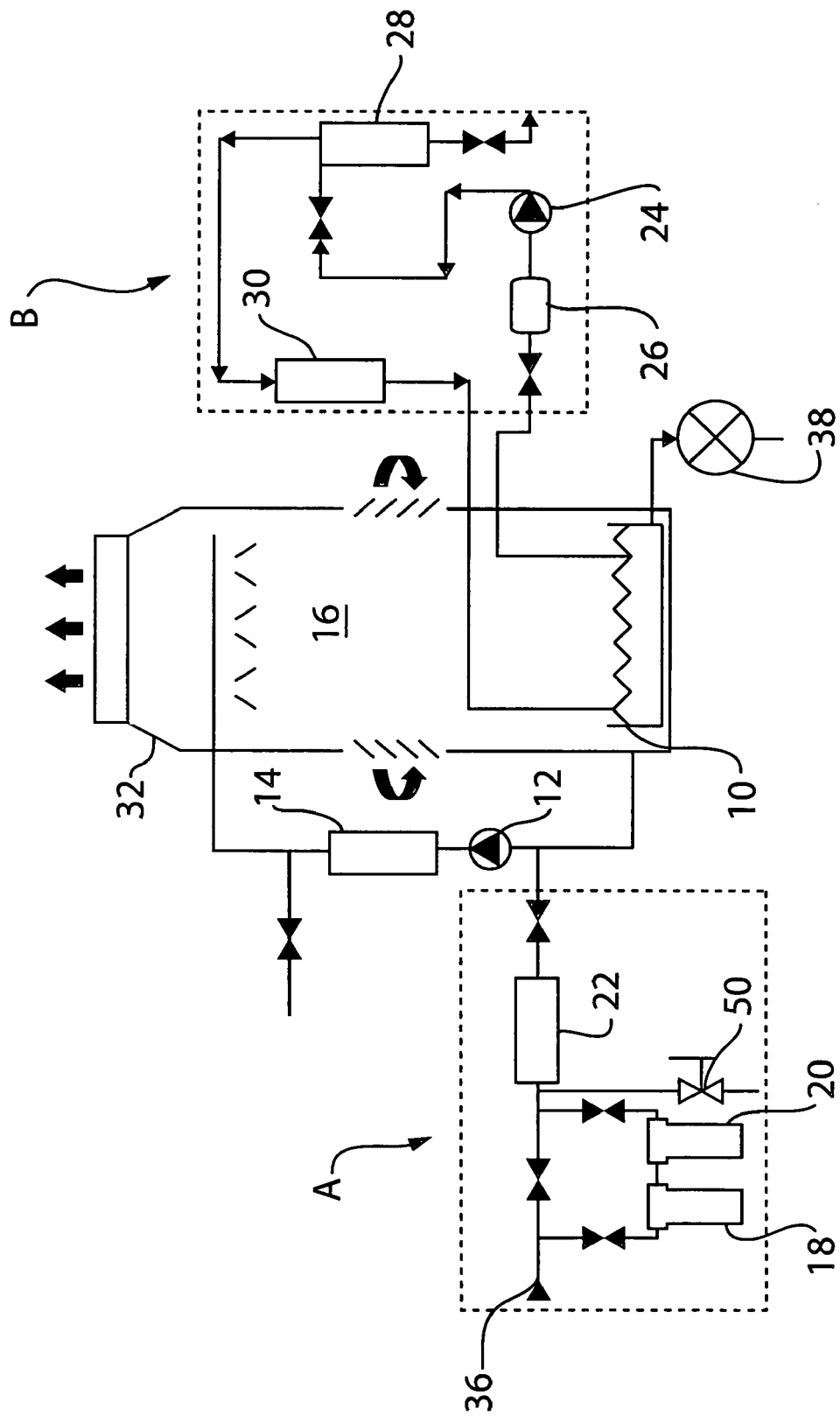
FIG. 1. is a schematic representation of a typical cooling tower which illustrates with Module 'A' and Module 'B' a preferred method and apparatus for automatically treating water according to the invention.

Cooling towers are designed to work on an evaporative process in conjunction with a heat exchanger/chiller condenser (14). A tower (32) will typically include baffles or fill and spray bars (16) or like elements having increased surface areas over which warm water cascades. At the same time, cooling tower fans (not shown) move air over the cascading water to increase evaporation and lower the water temperature. The resultant cooled water is cycled back through a chiller condenser (14) where it picks up heat and is then returned to the tower (32) to be cooled. As the water evaporates in the tower (32), the dissolved solids in the water which collect in the tower sump (10) become concentrated. To maintain a constant water volume within the system, make-up water must be continuously added to compensate for the water lost through evaporation in the tower (32), and through 'blow-down'.

Scale builds up in the chiller condenser (14) and in the fill and spray bars (16) in the tower (32) with conventional chemical treatment. This scale reduces the heat transfer efficiency of the condenser (14). In addition, the cooling tower water is subjected to biological contamination by airborne micro-organisms from the air, which are sucked into the tower (32) by the fans. Microbiological contamination of this type entering the cooling tower recirculation water is a major cause of corrosion of metallic surfaces due to bio-film formation. Known chemical water treatment processes result in having to 'rod-out' chiller condenser tubes (14) and/or "acid-wash", to reduce excess energy costs, and protect the system from severe damage.

To prevent and control the problems of scale and fouling, high corrosion rates (usually >3 m.p.y. with conventional chemical treatment), and low cooling tower life span, the present invention automatically performs several functions, some by themselves and others in conjunction with one another, as follows:

FIG. 1 is a schematic representation of a cooling tower treatment system illustrating the present invention. A typical cooling tower installation, portions of which are illustrated in FIG. 1, includes a make-up water line (36) discharging fresh water into the tower sump (10), continually replacing the total amount of water loss from evaporation and sump discharge water losses. A cooling tower recirculating pump(s) (12), circulates cooled water from the tower sump (10), through the condenser side of a heat exchanger (14), where it picks up building heat from the evaporator side of the chiller (14), and then from there is piped to a spray bar system (16) mounted at the top of the tower (32). The water from the spray bars (16) cascades down into the tower sump (10), and then is piped back into the condenser side of the heat exchanger (chiller) (14).

In this preferred embodiment a typical cooling tower is fitted with the groups of components identified as Module A and Module B in FIG. 1, which go to make up the invention.

Module A, which treats incoming make-up water, consists of an iodine generator canister (18), (see FIG. 3.) a mineral suppressant generator canister (20), (see FIG. 2), and a physical type water conditioner (22).

Figure 4:
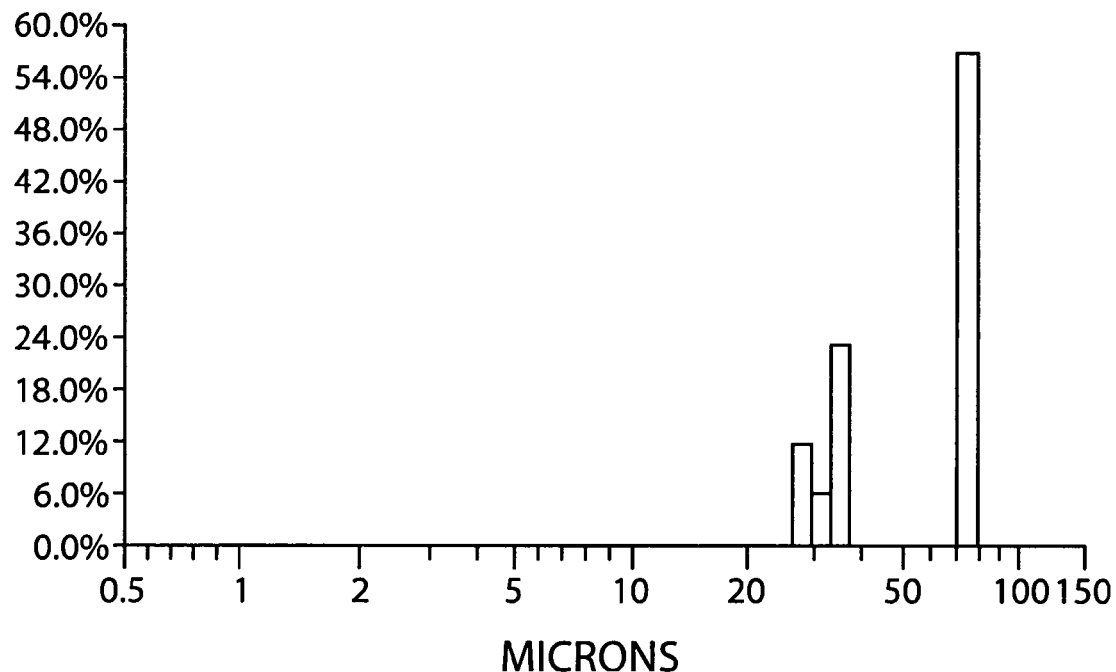
FIG. 4. is a diagrammatic drawing of a laser particle test result before hard water entered the conditioner.
Figure 5:
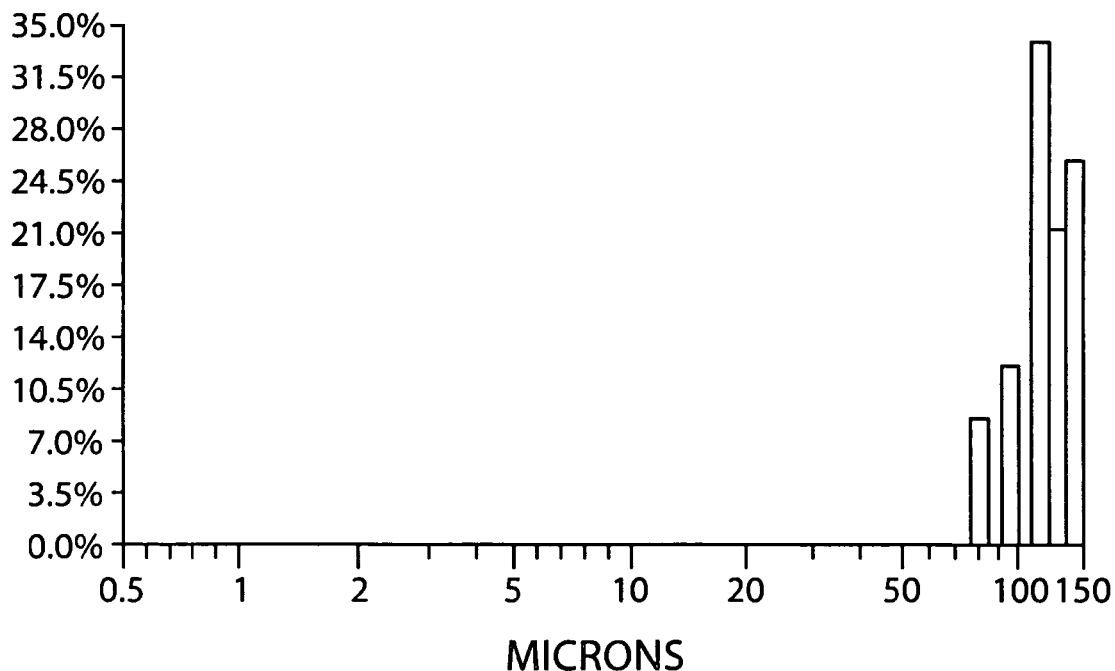
FIG. 5. is a diagrammatic drawing of a laser particle test result, in the same water as in FIG. 4, after the water had passed through the same conditioner.

Module B schematically depicts a side stream sump recirculation line, consisting of a strainer (26), a pump (24), a separator (28) & a physical-type water conditioner (30). Conditioner (22) used in Module A, and conditioner (30) used in Module B are physical type, self-cleaning, require no chemicals or electricity, and are maintenance free. Depending on water quality, physical type water conditioners such as capacitance or magnetic designs may be used that can produce large sized calcium carbonate particles in hard water, as measured by independent laser particle counts 'before' and 'after' hard water passes through the conditioner, as shown in FIG. 4 and in FIG. 5; also producing a minimum increase of 300% turbidity and 200% suspended solids. A capacitance type unit that may be used in either or both Module A and Module B is disclosed in U.S. Pat. No. 5,695,644. A suitable magnetic unit is disclosed in U.S. Pat. No. 4,422,933.

Conditioners other than those mentioned above can also be used if they offer the above required characteristics.

The conditioners (22) and (30), prevent the formation of scale, cause the dissolution of old scale and inhibit corrosion throughout the system. With the scale removed, and automatically maintained that way, the ferrous and ferric oxides then combine to form magnetite on the piping surfaces. Without the presence of scale, nutrients for micro-organisms are reduced to a minimum. In addition to a scale free environment, a very clean water system is maintained by a centrifugal separator (28) that reduces particulate contaminants down to minus 40 microns in the system (manual or automatic blow-down). Further reduction in the number of contaminant particles is achieved by the action of the conditioners (22) & (30) which automatically produce large sized calcium carbonate particles throughout the recirculation water system on a continual basis when treating hard water. These growing calcium carbonate particles coagulate with the organics, thereby preventing further corrosion as a result of the elimination of the organic nutrients, and are continually removed from the system by the sump recirculation line separator (28) and by the 'blow-down' valve (38). This blow down valve (38) is a valve which can be installed in alternative places but usually into a pipe which eminates, from the sump (10). It is actuated electrically by a timer, which in turn is signaled electrically from the make up water line meter. This water meter is pre set to signal the timer for (say) every 25 gallons flowing through the make up water pipe (36). The timer can be adjusted for controlling the concentration of the chlorides in the cooling tower water. The strainer (26) installed before the sump recirculating pump (24) eliminates larger particles and debris.

Water that has been cooled by evaporation in the tower (32) is collected in the sump (10). The cold sump water is piped back into the chiller condenser (14) by the main recirculation pump(s) (12). The heated water exiting the chiller condenser (14) is returned to the tower (32) for evaporative cooling. The water in the sump (10) is cycled through Module B by a pump (24). Larger particulate contaminants are removed from the water by a strainer (26). Particle size of scale and other contaminants throughout the cooling tower system is reduced below minus 40 microns by the Model B separator (28). Water directed back to the sump (10) passes through a water conditioner (30), which further ensures elimination of calcarious and organic contaminants, maintaining the recirculation water in an unsaturated mode, with the continual production of large calcium carbonate particles. Incoming make-up water is treated in Module A by the iodine conditioner (18), zinc conditioner (20), and water conditioner (30).

The make up water assembly incorporates two 'see through' type similar canisters containing zinc in one canister (20) and iodine in the other canister (18)

In the zinc canister (20) at the bottom of the vertical canister there is an inlet tube (40), with nozzle holes (42) designed to exit the water into the nozzle cone (44), creating a deep penetration scrubbing action on the zinc. In the iodine conditioner (18) there is an inlet tube (46) with holes (48). This design does not have a nozzle cone since a lesser action is desirable. This internal design difference is to obtain the maximum desired water action for each of the two elements, ensuring consistent results i.e. the scrubbing action on the zinc, which is less desirable on the iodine. The feed water for the two canisters (18) and (20) is derived from some of the make-up water being diverted from the make up water pipe (36) by an adjustable valve, located in the make up water line, between an inlet pipe and an outlet pipe to the generators. This water passes through the iodine canister (18), to introduce iodine; and some of this make up water diverted into the micro-mineral suppressant canister (20), for zinc to be metered in amounts sufficient to control bio-organic contaminants. The iodine is discharged from the iodine canister (18) through a 'see through' type horizontal flexible tube to a needle valve, that controls the iodine discharged back into the make up water main pipe (36). Concentrated iodine is very aggressive, so all materials used have to be neutral to iodine. The micro-mineral suppressant canister (20) internal parts and design to generate zinc, has to be constructed to a modified fluidized bed principle for ensuring that the surfaces of the zinc are constantly self-scrubbed when operating, for consistent erosion release, giving an on-going accuracy of correct metering, even for small injections, the metering being controlled by the aforementioned adjustable valve in the make up water line.

An additional benefit offered by the invention is that, as the water concentrates, build up of total dissolved solids, hardness (as CaCO3), TDS, conductivity levels are reduced by about 40%, as compared to conventional chemical treatment, thereby permitting increased cycles of concentration, and considerable water savings. This occurs because the calcium carbonate particles produced by the conditioners combine with the organics, which together then have a specific gravity heavy enough to be automatically discharged. As an example, in Great Lakes Water, cooling tower water use and discharge is reduced by at least 25%. In addition to this water savings, in hard make up water situations, even more water is saved compared to chemical treatment which has to 'soften' this water before use, involving the additional cost of an appropriately sized water softener, plus having to use quantities of salt. In addition to this expense, the 'softener' has to be regenerated on a regular basis (such as twice/week), which uses up large quantities of water. The system, according to the invention, does not require a softener in hard water. Cooling towers using chemical treatment, use vast quantities of water, whereas according to the invention, up to 40% water use and discharge can be saved.

The above description explains how the total recirculation water is treated, which creates and maintains a very clean system, a mandatory condition for effective prevention of microbiological contamination. The invention adds to this bacterial control by automatically and accurately metering into the make up water line (36), as described below <250 p.p.b. of zinc, and <200 p.p.b. of iodine for bacteria kill. The iodine, then has a final adjustment to reflect 1 p.p.m. in the recirculation water. The iodine becomes iodate, due to the aeration of the sump cascading water. At least some of the iodine is oxidized by the aerated circulating water to iodate ion which diffuses into residual sediments or biofilms containing anaerobe organisms and is reduced to free iodine by reaction with the anaerobe organisms to deactivate the anaerobe organisms. The iodate in a clean system, at 1 p.p.m., kills *legionella* up to 99.99999% (U.S. Dept. of Health—Atlanta). The zinc, when present at only 50 p.p.b., kills *pseudomonas* & other pathogens. *Pseudomonas* when present is harmful because it regenerates bio-nutrients which are a major source of nutrients for *legionella*. The iodate penetrates under biofilms, even penetrates *amoebas* thereby killing *legionella*. Algae is efficiently controlled by the combination of iodate and zinc. In particular, the zinc completes functions complementary to the iodine addition measures, and complements iodine limitations at controlling algae through strong suppression of the "Blue-green" group of algae so as to avoid resorting to more toxic algicides, such as copper, silver, ozone, chlorination chemicals, and also inhibits more persistent tower micro-organisms, such as the aforementioned *pseudomonads* for a further minimization of biocorrosion factors, and also creates near-saturation of the water with zinc that additionally slows corrosion upon all the protective zinc galvanizing present upon metallic equipment surfaces.

Each canister holds enough zinc and iodine to last 2 to 3 years before a refill is required. This replenishment is a simple operation, and takes approximately 20 minutes. A test valve or tap (50) in provided in module A. By opening this valve (50) and collecting a sample of the water, it is possible to sample the iodine content of the make up water, and thus ensure that the percentage is adjusted to produce optimum results.

Depending on water quality, other metals at <500 p.p.b. may possibly be used in addition to, or in place of zinc. The water quality throughout the system is always maintained to potable standards, when the make-up water is of potable quality.

To summarise the operation, water that has been cooled by evaporation in the tower (32) is collected in the sump (10). The cold sump water is piped back into the chiller condenser (14) by the main recirculating pump(s) (12). The heated water exiting the chiller condenser (14) is returned to the tower (32) for evaporative cooling. The water in the sump (10) is cycled through Module B by a pump (24). Larger particulate contaminants are removed from the water by a strainer (26). Particulate size of scale and other contaminants throughout the cooling tower system is reduced below minus 40 microns by the separator (28). Water directed back to the sump (10) passes through a water conditioner (14), which further ensures elimination of calcarious and organic contaminants, maintaining the recirculation water in an unsaturated mode, with the continual production of large calcium carbonate particles. Incoming make-up water is treated in Module A by the zinc, iodine and a water conditioner (22).

Figure 2:
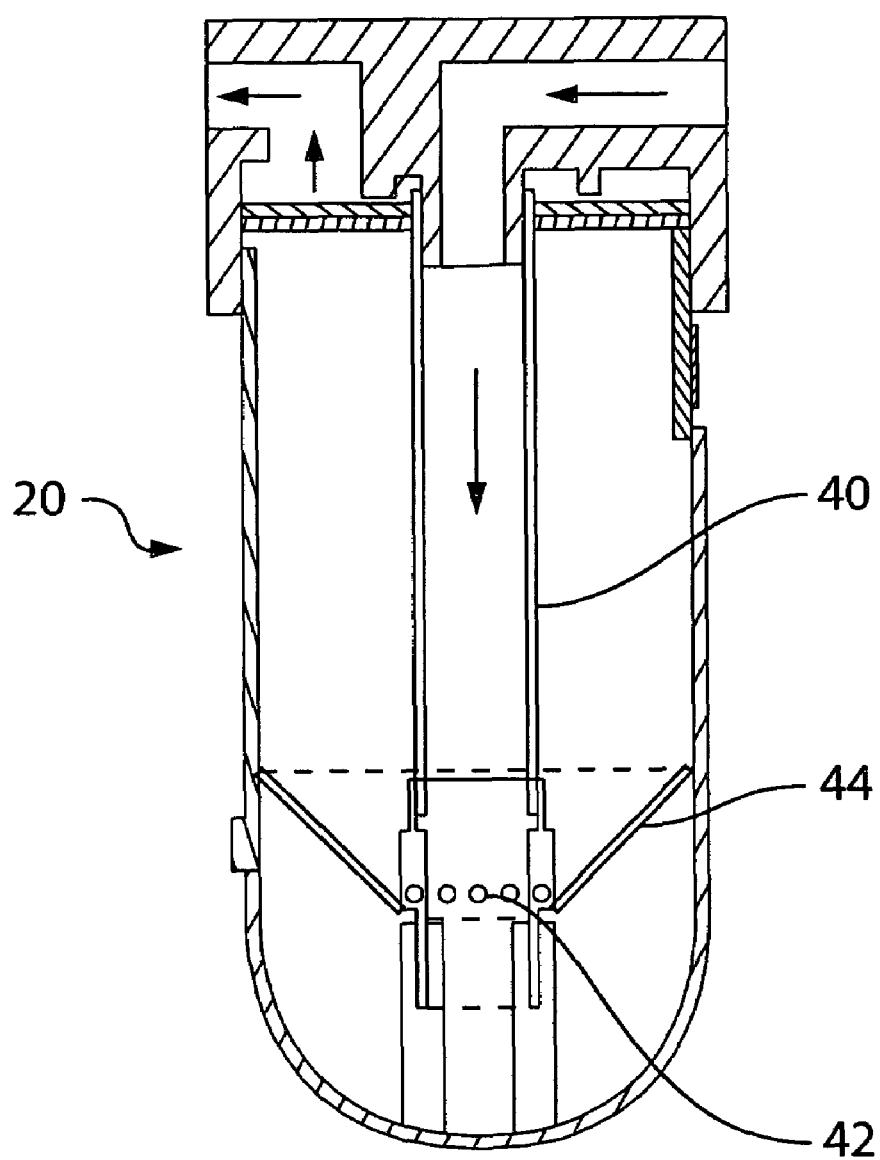
FIG. 2. is a schematic representation of the self-regulating zinc generator (20), which in conjunction with FIG. 3 schematic is attached to the make up water line. (36)
Figure 3:
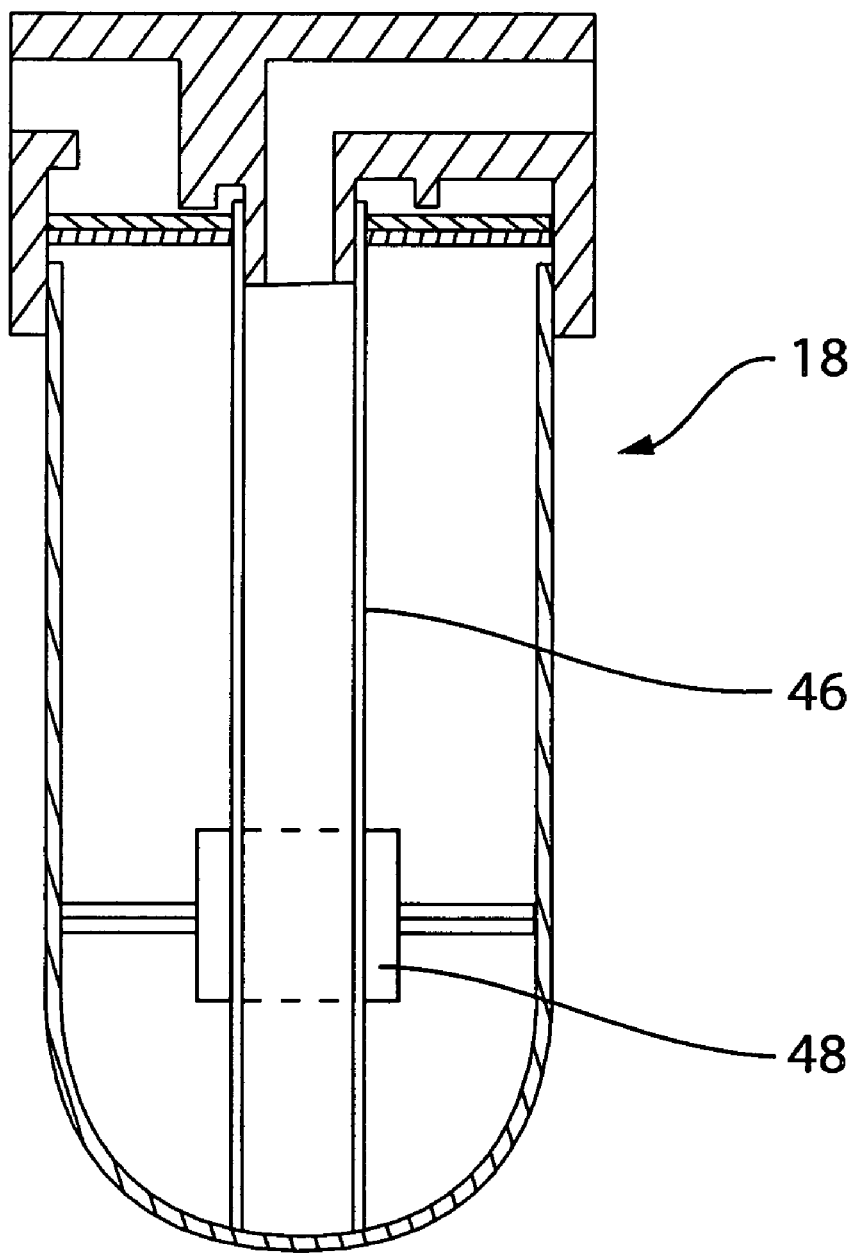
FIG. 3. is a schematic representation of the self regulating iodine generator (18), which in conjunction with FIG. 2 is attached to the make up water line. (36)

The make up water assembly consists of two 'see through' type similar canisters containing zinc in canister (20) and iodine in canister (18), the difference in the two canisters being basically that the water discharge holes at the bottom of the vertical canister inlet tube are designed to exit the water into a nozzle cone (44) for the zinc, but directly out into the canister, above the disc, for the iodine. This internal design difference is to obtain the maximum desired water action for each of the two metals, ensuring consistent results. The feed water for the two canisters is derived from some of the make up water being diverted from the make up water pipe (36) through the iodine canister (18), to introduce iodine, which converts to iodate with the aeration in the tower; and some of the make up water diverted into the micro-mineral suppressant canister (20), for zinc to be metered in amounts sufficient to control bio-organic contaminants. The iodine is discharged from the iodine canister (18) through a 'see through' type flexible tube to a needle valve, that controls the iodine discharged into the make up water main pipe (36). The iodine canister comprises visible feeder equipment that permits visual assessment as to whether trace iodine addition is being maintained, flow-proportionately feeding iodine-saturated water to make-up water flows via a sidestream loop. The iodine becomes more concentrated by evaporation of the circulating water. Concentrated iodine is very aggressive, so all materials used have to be neutral to iodine. The micro-mineral suppressant canister (20) internal parts and design have to be constructed to a modified fluidized bed principle for ensuring that the surfaces of the zinc are constantly self-scrubbed when operating, for consistent erosion release, giving an on-going accuracy of correct reading, even for small injections. To attain the scrubbing of the zinc surfaces, FIG. 2 shows the inlet water entering the conventional filter exit into the upper canister centre, and being discharged out of the bottom of the internal vertical tube, through equally spaced and angled holes (42) discharging into a cone (44). This creates a swirling action on the zinc granules, contained in the canister (20) resulting in the scrubbing of the zinc surfaces, which prevents the surfaces from oxidizing.

All the make-up water then passes through the Module A water conditioner(s) (22), which changes the water into an unsaturated state, dissolves old scale, & inhibits corrosion.

The system shown in schematic FIG. 1 is for the purposes of illustration only, and is not intended to be limiting, since cooling towers are designed with many different types of configurations, including, but not restricted to, direct & indirect evaporative cooling towers, 'coolers', mechanical draft, hyperbolic towers etc.

The invention can operate efficiently for any type or size of cooling tower. Persons could generate additional embodiments without departing from the spirit of the claimed inventions. For instance, all or part of the make up water assembly could be applied to controlling microbiological contamination in water flow circuits, for example to control *legionella*. etc. The schematics provided are to facilitate understanding of the invention only. Also water quality for the make-up water varies over a wide range, and therefore has to be treated accordingly sometimes before entering the make up water line (36).

This water treatment method greatly improves the operation of cooling towers; namely, in the permanent elimination of scale build-up on all tower and heat exchanger surfaces; in the effective control of biofouling; in the related suppression of biofilm sponsored corrosion; and in the eradication of tower contamination by biological growths, particularly of pathogenic organisms, such as *legionella*. This results in a very effective, 24 hour/day, 7 days/week automatic control of scale, fouling, corrosion, and microbiological contamination. The system ensures minimal heat transfer losses and pollutional water discharges, with greatly reduced water and energy consumption, applied chemical quantities and operational and ownership costs, and greatly extended cooling tower life. The foregoing is a description of a preferred embodiment of the invention which is given here for the purposes of illustration. The invention is not to be taken as restricted to any of the specific features as described but comprehends all such variations as come within the scope of the following claims.

What is claimed is:

1. A method of treating water circulating in a water flow circuit, from which water flow circuit water is lost and to which make up water is added, to control scale, biofouling, corrosion, and microbiological contamination comprising the steps of:
    passing the water through at least one conditioning unit to inhibit scale deposits and associated organic nutrients from forming on flooded surfaces of the water flow circuit, said conditioning unit producing calcium carbonate particles which coagulate with the organic nutrients in the water;
    removing the calcium carbonate particles that are coagulated with the organic nutrients from the water;
    adding a trace level of iodine to the circulating water to control said microbiological contamination; and
    adding a trace level of zinc to the circulating water for inhibiting residual iodine-resistant algal and bacterial organisms and corrosion in said water flow circuit.

2. The method as claimed in claim 1, further comprising aerating the circulating water to oxidize the iodine to iodate in the circulating water.

3. The method as claimed in claim 2 wherein:
    at least some of the water lost from the water flow circuit is lost through evaporation; and
    the iodine in the circulating water becomes more concentrated by, at least in part, evaporation of the circulating water.

4. The method as claimed in claim 3 wherein at least one of the trace level of iodine and the trace level of zinc is added to the circulating water by first adding the trace level to make-up water and then adding the make-up water to the circulating water in the water flow circuit.

5. The method as claimed in claim 4 wherein the iodine penetrates into protective sediment and biofilm shelters of resisting micro-organisms.

6. The method as claimed in claim 2 wherein at least some of the iodine is reduced by disinfection reactions to iodide ion and at least some iodide is restored to iodine by aeration of the circulating water.

7. The method as claimed in claim 6 wherein at least some of the iodine is oxidized by the aerated circulating water to an iodate ion form and wherein at least some of the iodate ion diffuses into residual sediments or biofilms containing anaerobe organisms and at least some of the iodate ion is reduced to free iodine by reaction with at least some of the anaerobic organisms, and at least some of the free iodine reacts with at least some of the anaerobe organisms and deactivate at least some of the anaerobe organisms.

8. The method as claimed in claim 7 wherein the zinc completes functions complementary to iodine addition measures, and complements iodine limitations at controlling algae to suppress the "B blue-green" group of algae so as to avoid resorting to more toxic algicides and also inhibits more persistent tower micro-organisms for a further minimization of biocorrosion factors; and creates near-saturation of the water with zinc that additionally slows corrosion upon all the protective zinc galvanizing present upon metallic equipment surfaces.

9. The method as claimed in claim 7, wherein the zinc kills *pseudomonas* within the circulating water.

10. The method as claimed in claim 7, wherein the zinc acts to create near-saturation of the circulating water with zinc to thereby inhibit corrosion at zinc galvanizing present upon metallic equipment surfaces.

11. The method as claimed, in claim 2, wherein the iodine is added using visible feeder equipment that permits visual assessment as to whether trace iodine additions are being maintained, flow-proportionately feeding iodine-saturated water to-make-up flows via a sidestream loop.

12. The method as claimed in claim 1, wherein the water flow circuit water is lost, by evaporation.

* * * * *